United States Patent
Yang

(10) Patent No.: US 8,699,605 B2
(45) Date of Patent: Apr. 15, 2014

(54) METHOD AND APPARATUS FOR RECEIVING IN MULTIPLE-INPUT MULTIPLE-OUTPUT SYSTEM

(75) Inventor: Joo-Yeol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 699 days.

(21) Appl. No.: 12/856,005

(22) Filed: Aug. 13, 2010

(65) Prior Publication Data

US 2011/0051861 A1    Mar. 3, 2011

(30) Foreign Application Priority Data

Aug. 27, 2009 (KR) ........................ 10-2009-0079898

(51) Int. Cl.
*H04B 7/02* (2006.01)
*H04L 1/02* (2006.01)

(52) U.S. Cl.
USPC ........... 375/267; 375/260; 455/132; 455/133; 455/134; 455/135; 455/504

(58) Field of Classification Search
None
See application file for complete search history.

(56) References Cited

U.S. PATENT DOCUMENTS

| | | | |
|---|---|---|---|
| 2005/0286659 A1* | 12/2005 | Abe et al. | 375/341 |
| 2006/0203891 A1* | 9/2006 | Sampath et al. | 375/132 |
| 2007/0127589 A1* | 6/2007 | Hwang et al. | 375/267 |
| 2007/0162827 A1* | 7/2007 | Walton et al. | 714/774 |
| 2011/0002421 A1* | 1/2011 | Murakami et al. | 375/341 |
| 2012/0155579 A1* | 6/2012 | Zilberman et al. | 375/341 |

OTHER PUBLICATIONS

Yuan Li et al., "Parallel Detection for V-BLAST System", IEEE, 2002.

* cited by examiner

*Primary Examiner* — Shuwang Liu
*Assistant Examiner* — Gina McKie
(74) *Attorney, Agent, or Firm* — Jefferson IP Law, LLP

(57) ABSTRACT

A receiving method and apparatus in a Multiple-Input Multiple-Output (MIMO) communication system are provided. The method includes receiving reception signals through a plurality of reception antennas, grouping symbols corresponding to the reception signals, respectively, into a preset number of groups, and rearranging symbols of the respective groups, transforming the reception signals by applying QR decomposition to the reception signals, sequentially canceling interference due to each of total possible candidate symbols for a first symbol based on an order of the rearranged symbols in the transformed reception signals, determining a portion of the total possible candidate symbols to be a candidate symbol set for each remaining symbol, except for the first symbol, using the interference-canceled reception signal, and determining log-likelihood ratio values of the first symbol, which are to be used upon decoding the received signals, using candidate symbols for the first symbol and each remaining symbol.

10 Claims, 8 Drawing Sheets

METHOD AND APPARATUS FOR RECEIVING IN MULTIPLE-INPUT MULTIPLE-OUTPUT SYSTEM

PRIORITY

This application claims the benefit of a Korean patent application filed in the Korean Intellectual Property Office on Aug. 27, 2009 and assigned Serial No. 10-2009-0079898, the entire disclosure of which is hereby incorporated by reference.

BACKGROUND OF THE INVENTION

1. Field of the Invention

The present invention relates to a receiving method and apparatus in a Multiple-Input Multiple-Output (MIMO) communication system. More particularly, the present invention relates to a receiving method and apparatus employing an enhanced Modified Maximum Likelihood (MML) detection scheme.

2. Description of the Related Art

A Multiple-Input Multiple-Output (MIMO) system, which employs multiple transmission/reception antennas, allows respective transmission antennas to transmit independent signals, so that it is possible to increase an amount of data transmitted at one time. Compared with a Single-Input Single-Output (SISO) system, which uses a single transmission/reception antenna, the MIMO system has an advantage in that it is possible to increase the system capacity. Due to such advantages, recently, the MIMO scheme has been applied to standards of commercialized systems requiring high-speed data communication, which are the standards of Worldwide Interoperability for Microwave Access (WiMAX) and Long Term Evolution (LTE).

However, in the MIMO communication system, when mutually different data streams are simultaneously transmitted from the respective transmission antennas, mutual interference occurs between the simultaneously transmitted data streams. Therefore, schemes for enabling a receiving apparatus to detect signals based on the mutual interference have been provided.

A Maximum Likelihood (ML) detection scheme, which is one of a signal detection schemes, is a scheme that makes it possible to acquire optimal performance.

However, the ML detection scheme has a problem in that, as the modulation order of data symbols increases in order to achieve high-speed data transmission, complexity of calculations increases exponentially. In addition, since most commercialized systems employ channel coding, a receiving apparatus does not perform a hard decision with a detection result, but must calculate a Log-Likelihood Ratio (LLR) for a channel decoder, instead of performing, thereby increasing the amount of calculations.

Therefore, a need exists for a detection scheme in a MIMO communication system for reducing complexity of calculations.

SUMMARY OF THE INVENTION

An aspect of the present invention is to address at least the above-mentioned problems and/or disadvantages and to provide at least the advantages described below. Accordingly, an aspect of the present invention is to provide a receiving method and apparatus employing an enhanced Modified Maximum Likelihood (MML) detection scheme in a Multiple-Input Multiple-Output (MIMO) communication system.

Another aspect of the present invention is to provide a method and apparatus for determining a preset number of candidate symbols for a corresponding symbol through group slicing using an imaginary constellation.

A further aspect of the present invention is to provide a receiving method and apparatus for a number of candidate symbols for remaining symbols, except for a first symbol, upon calculating Log-Likelihood Ratios (LLRs) of the remaining symbols, through the use of a Maximum Likelihood (ML) hard decision result of a symbol vector, which has been acquired in the LLR calculation procedure for the first symbol.

In accordance with an aspect of the present invention, a receiving method in a MIMO communication system is provided. The method includes receiving reception signals through a plurality of reception antennas, grouping symbols corresponding to the reception signals, respectively, into a preset number of groups, and rearranging symbols of the respective groups, transforming the reception signals by applying QR decomposition to the reception signals, sequentially canceling interference due to each of total possible candidate symbols for a first symbol based on an order of the rearranged symbols in the transformed reception signals, determining a portion of the total possible candidate symbols to be a candidate symbol set for each remaining symbol, except for the first symbol, using the interference-canceled reception signal, and determining log-likelihood ratio values of the first symbol, which are to be used upon decoding the received signals, using candidate symbols for the first symbol and each remaining symbol.

In accordance with another aspect of the present invention, a receiving apparatus in a MIMO communication system is provided. The apparatus includes a reception unit for receiving reception signals through a plurality of reception antennas, an order rearrangement unit for grouping symbols corresponding to the reception signals, respectively, into a preset number of groups, and rearranging symbols of the respective groups, a QR decomposition unit for transforming the reception signals by applying the QR decomposition to the reception signals, an interference canceling unit for sequentially canceling interference due to each of total possible candidate symbols for a first symbol based on an order of the rearranged symbols in the transformed reception signals, a candidate symbol selection unit for determining a part of the total possible candidate symbols to be a candidate symbol set for each remaining symbol, except for the first symbol, using the interference-canceled reception signal, and a log-likelihood ratio calculation unit for determining log-likelihood ratio values of the first symbol, which is to be used upon decoding the received signals, using candidate symbols for the first symbol and each remaining symbol.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions will be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide methods for decreasing calculation complexity in a general Maximum Likelihood (ML) detection scheme in which a representative scheme may be a Parallel Detection (PD) scheme.

Figure 1A:
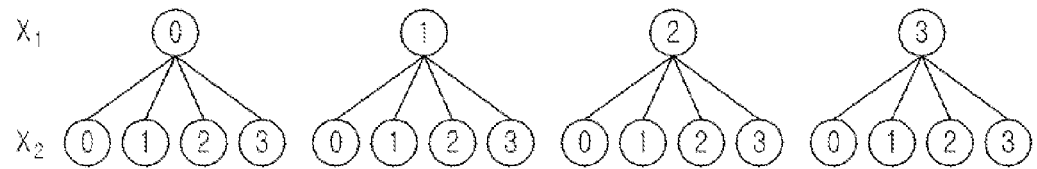
FIGS. 1A and 1B illustrate candidate symbol vector sets for symbol vectors in a general Maximum Likelihood (ML) detection scheme and a Parallel Detection (PD) scheme, respectively.
Figure 1B:
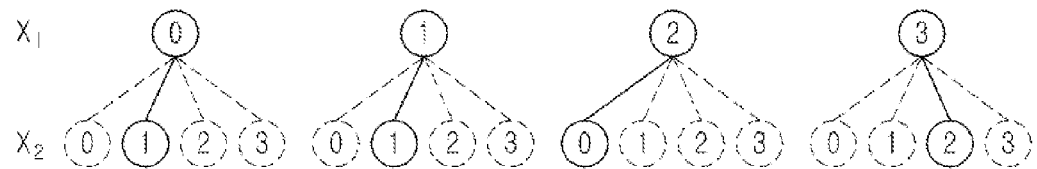

FIGS. 1A and 1B illustrate candidate symbol vector sets for symbol vectors in a general ML detection scheme and a PD scheme, respectively. For convenience of description, it is assumed herein that there are two transmission antennas and two reception antennas, and a Quadrature Phase Shift Keying (QPSK) modulation scheme is used.

Referring to FIG. 1A, the ML detection scheme uses every possible combination of symbols $x_1$ and $x_2$ transmitted through the transmission antennas as candidate symbol vector sets. When the QPSK modulation scheme is used, each symbol may be one of four QPSK symbols, so that a total of 16 (4×4) candidate symbol vector sets exists.

Referring to FIG. 1B, the PD scheme is performed in such a manner as to select one symbol, e.g., $x_1$, of the symbols, to perform interference canceling on every possible candidate symbol capable of having $x_1$ in a reception signal, and then to determine another symbol, i.e., $x_2$, through slicing. Through the PD scheme, the number of finally-determined candidate symbol vectors for $x_2$ becomes four. When the PD scheme is used, the number of candidate symbol vectors for symbols is reduced as compared with that in the ML detection scheme, so that it is possible to significantly reduce the complexity in calculating a Euclidean distance.

Hereinafter, a case where the PD scheme is used in a MIMO communication system will now be described in more detail. For convenience of description, it is assumed that there is a transmitting apparatus including two transmission antennas and a receiving apparatus including two reception antennas in the MIMO communication system.

Equation 1 below represents reception signals which the two reception antennas receive from the two transmission antennas, respectively.

$$y = Hx + u \quad (1)$$
$$\Rightarrow \begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} u_1 \\ u_2 \end{bmatrix}$$

In Equation 1, y denotes a reception signal vector which is expressed as $$y = \begin{bmatrix} y_1 \\ y_2 \end{bmatrix}$$

including the reception signals received through the two reception antennas, H denotes a channel matrix which is expressed as $$H = \begin{bmatrix} h_{11} & h_{12} \\ h_{21} & h_{22} \end{bmatrix}$$

for paths between the two transmission antennas and the two reception antennas, x denotes a symbol vector which is expressed as $$x = \begin{bmatrix} x_1 \\ x_2 \end{bmatrix}$$

including symbols transmitted from the two transmission antennas, and u denotes a background noise of the two reception antennas, which is expressed as $$u = \begin{bmatrix} u_1 \\ u_2 \end{bmatrix}.$$

Here, each of the symbols is constructed by one or more bits.

The PD scheme applied to a reception signal by the receiving apparatus, as expressed in Equation 1, will be described in more detail below.

First, the receiving apparatus selects one of the two symbols. Here, it is assumed that the receiving apparatus selects $x_1$. Various methods may be used to select the symbol, but they have no direct relation to the gist of the present invention, so a detailed description thereof will be omitted.

Second, the receiving apparatus cancels interference due to every candidate symbol which may have $x_1$ in the reception signal, by using Equation 2 below.

$$z_k = y - h_1 \hat{x}_{1,k} \Rightarrow \begin{bmatrix} z_{1,k} \\ z_{2,k} \end{bmatrix} = \begin{bmatrix} y_1 \\ y_2 \end{bmatrix} - \begin{bmatrix} h_{11} \\ h_{21} \end{bmatrix} \hat{x}_{1,k} \; k \in \{0, 1, \ldots, M-1\} \quad (2)$$

In Equation 2, $\hat{x}_{1,k}$ denotes a $k^{th}$ candidate symbol value for $x_1$, and is M in total number when an M-order (M-ary) modulation scheme is used. In addition, $z_k$ denotes a reception signal vector obtained after interference cancellation, and is M in total number.

Finally, the receiving apparatus performs a slicing operation as shown in Equation 3 below through the use of a total of M reception signal vectors $z_k$, from which interference has been canceled by Equation 2, thereby determining candidate symbol values for $x_2$.

$$\hat{x}_{2,k} = Q(h_2^H z_k) \; k \in \{0, 1, \ldots, M-1\}, \; h_2 = \begin{bmatrix} h_{12} \\ h_{22} \end{bmatrix} \quad (3)$$

In Equation 3, $\hat{x}_{2,k}$ denotes a $k^{th}$ candidate symbol value for $x_2$, a function of "Q( )" denotes a slicing operation function. That is, the slicing operation function is a function of mapping a reception signal to a corresponding constellation point of a preset constellation. The receiving apparatus acquires a candidate symbol vector set constituted by a total of M candidate symbol vectors for $x_2$, first selected by Equations 2 and 3.

Consequently, while a total of M2 Euclidean distances must be calculated when the ML detection scheme is used for a reception signal, as shown in Equation 1, the PD scheme based on Equations 2 and 3 requires calculation of only a total of M Euclidean distances. Therefore, as the PD scheme employs a higher-order modulation, e.g., 64 QAM, the calculation complexity becomes lower, as compared with the ML detection scheme. In addition, the PD scheme has an advantage in that it is possible to obtain the same performance as that of the ML detection scheme in hard decision.

Meanwhile, the PD scheme has been described without taking channel decoding into consideration. An actual PD scheme while taking channel decoding into consideration requires an additional procedure while taking an abnormal operation occurring in an added Log-Likelihood Ratio (LLR) calculation step into consideration.

Figure 2:
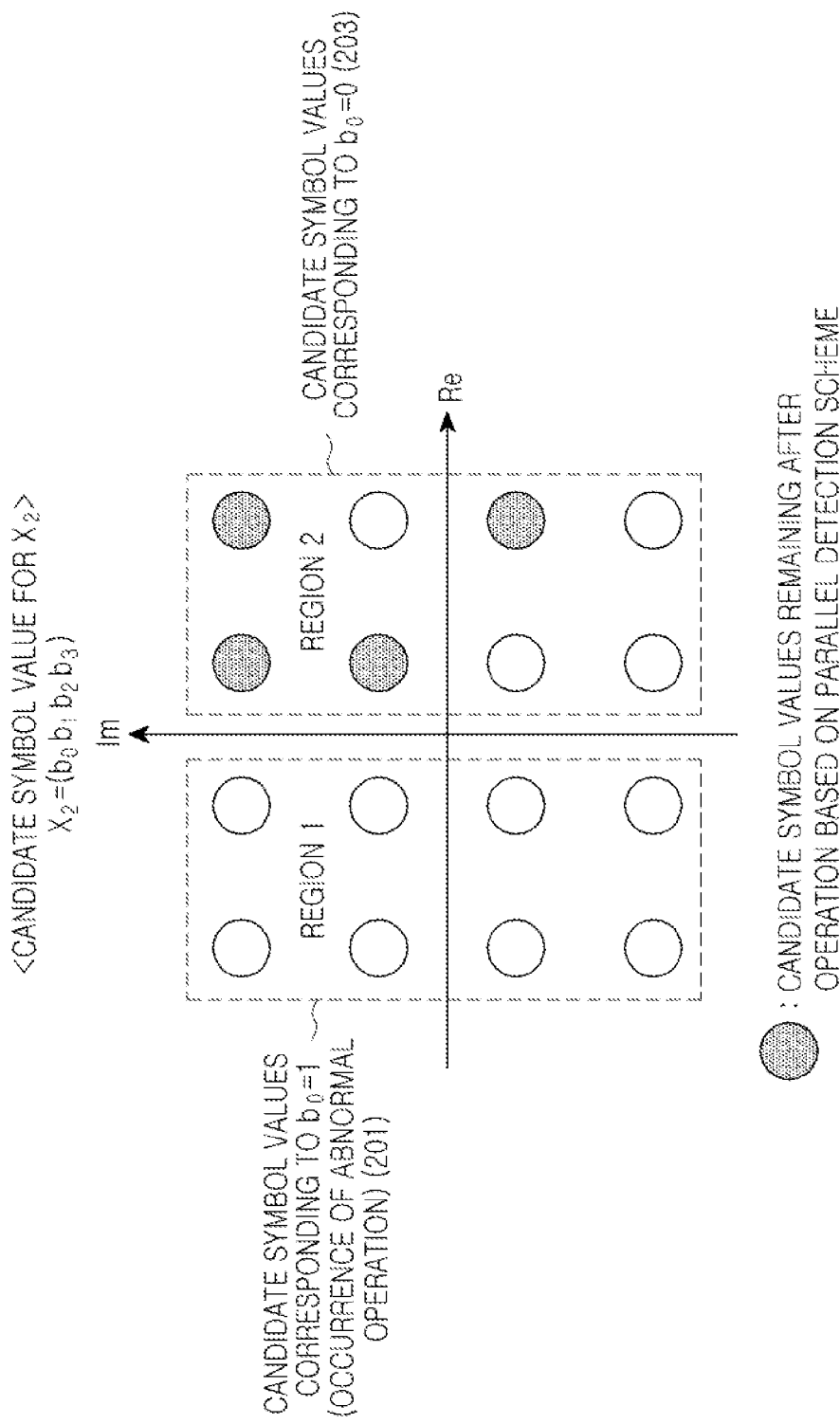
FIG. 2 illustrates an example of remaining candidate symbol values, which have not been determined as candidate symbols for $x_2$ after an operation based on a general PD scheme while taking channel decoding into consideration.

FIG. 2 illustrates an example of remaining candidate symbol values, which have not been determined as candidate symbols for $x_2$ after an operation based on a general PD scheme while taking channel decoding into consideration.

Here, it is assumed that the modulation order is 16, that is, a modulation scheme of 16 QAM is used.

Referring to FIG. 2, after the operation of the PD scheme, the remaining candidate symbol values, which have not been determined as candidate symbols for $x_2$, are represented by non-shaded circles. In this case, candidate symbol values, which are included in $x_2$, and the first transmission bit "$b_0$" of which has a value of "1," are located in a first region 201 with respect to an Imaginary (Im) axis in a constellation, while candidate symbol values, which are included in $x_2$, and the first transmission bit "$b_0$" of which has a value of "0," are located in a second region 203.

A general LLR calculation procedure includes a step of finding a value minimizing the Euclidean distance with respect to the respective cases where $b_0$ has a value of "0" and has a value of "1," based on Equation 4 below.

$$L(b_\lambda \mid y, H) = \ln \frac{Pr(b_\lambda = 0 \mid y, H)}{Pr(b_\lambda = 1 \mid y, H)} \quad (4)$$

$$= \ln \frac{\sum_{x_\lambda \in A_{\lambda=0}} \exp\left(-\frac{\|y - Hx_\lambda\|^2}{\sigma_u^2}\right)}{\sum_{x_\lambda \in A_{\lambda=1}} \exp\left(-\frac{\|y - Hx_\lambda\|^2}{\sigma_u^2}\right)}$$

$$\approx \frac{\min_{x_\lambda \in A_{\lambda=1}} \|y - Hx_\lambda\|^2 - \min_{x_\lambda \in A_{\lambda=0}} \|y - Hx_\lambda\|^2}{\sigma_u^2}$$

In Equation 4, $b_\lambda$ denotes a $\lambda^{th}$ transmission data bit, $L(b_\lambda|y, H)$ denotes an LLR value of the $\lambda^{th}$ transmission data bit, Pr denotes a probability that $b_\lambda$ has a value of "0" or "1," $x_\lambda$ denotes a candidate symbol vector distinguished according to a $\lambda^{th}$ transmission data bit value, $A_{\lambda=k}$ denotes a set of candidate symbol vectors in which the $\lambda^{th}$ transmission data bit value is k, and $\sigma_u^2$ denotes an average power of a background noise variable.

In the first region 201, there are no candidate symbol values determined as candidate symbols for $x_2$. That is, there is no case where $b_0$ of $x_2$ has a value of "1" among the candidate symbols for $x_2$, so that an abnormal or unnecessary operation occurs in the LLR calculation procedure, in which $b_0$s included in the candidate symbols must have include both a value of "0" and a value of "1," as shown in Equation 4.

In order to solve such an abnormal operation occurring in the LLR calculation procedure, a Modified ML (MML) detection scheme has been proposed.

The MML detection scheme repeats a procedure of finding a candidate symbol vector set with respect to the respective symbols, thereby preventing an abnormal operation from occurring in the LLR calculation procedure. More specifically, when LLRs of bits included in $x_1$ are calculated, $x_1$ is selected according to the PD scheme, and then a procedure for finding a candidate symbol vector set for a remaining symbol, which has not been selected, is performed. In contrast, when LLRs of bits included in $x_2$ are calculated, $x_2$ is selected according to the PD scheme, and then a procedure for finding a candidate symbol vector set for a remaining symbol, which has not been selected, is performed. Through such an operation, the MML detection scheme makes it possible to have all candidate symbol values with respect to a symbol including a corresponding bit, the LLR of which is to be calculated. Accordingly, both a case where the corresponding bit has a value of "0" and a case where the corresponding bit has a value of "1" may exist, so that an abnormal operation does not occur in the LLR calculation procedure. In addition, the MML detection scheme has an advantage in that performance after channel decoding is the same as that in the ML detection scheme.

Recently, in a next-generation standard of Long Term Evolution (LTE) and Microwave Access (WiMAX), a larger number of transmission antennas, up to four or eight, have been taken into consideration in order to increase a data rate. In this case, according to the MML detection scheme, when a plurality of symbols are simultaneously detected, the respective possible candidate symbols must all be taken into consideration, even in the case of selecting candidate symbol sets for the remaining symbols, except for any one symbol. Accordingly, when three or more antennas are employed, the problem that the complexity of calculations increases exponentially occurs again. For example, when four transmission antennas are employed and 64 QAM modulation scheme is used, the MML detection scheme requires to calculate $64^3$ (approximately 260,000) number of Euclidean distances, i.e., LLRs. Such an amount of calculations corresponds to a level which is difficult to be applied in commercialized terminal modem chip development.

Therefore, according to an exemplary embodiment of the present invention, a detection method for reducing the complexity of calculations of the MML detection scheme in a MIMO communication system is provided. More specifically, the method includes a first step of rearranging symbols of a reception signal and applying a QR decomposition; a second step of selecting candidate symbol sets of the remaining symbols through the use of each of the candidate symbols for a first symbol; a third step of selecting a preset number of candidate symbols for each of the remaining symbols through group slicing using an imaginary constellation; a fourth step of performing interference canceling on candidate symbols determined through the third step with respect to the reception signal, and determining candidate symbol sets of remaining symbols, except for the first symbol and the next symbol, through slicing using the interference-reduced signal; and a fifth step of calculating LLRs of symbols, the candidate symbol sets of which have been determined, through Euclidean distance calculation of each corresponding candidate symbol set.

Figure 3:
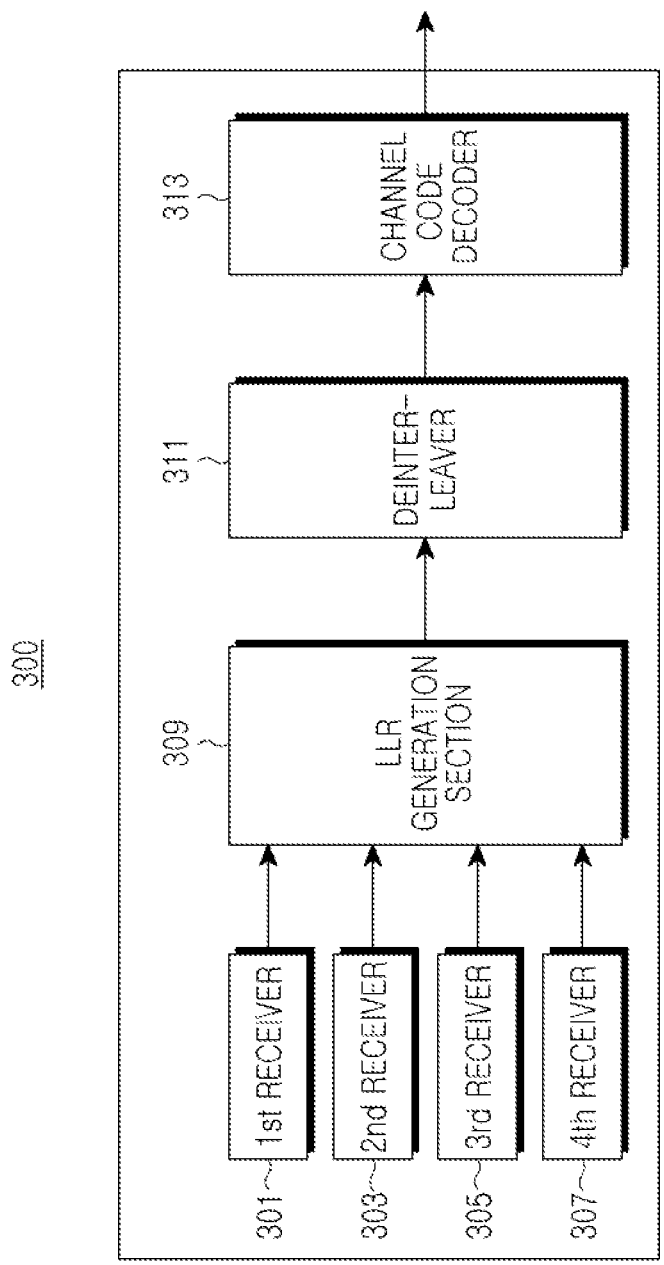
FIG. 3 is a block diagram illustrating a configuration of a receiving apparatus according to an exemplary embodiment of the present invention.

FIG. 3 is a block diagram illustrating a configuration of a receiving apparatus according to an exemplary embodiment of the present invention.

Referring to FIG. 3, the receiving apparatus 300 includes four receivers, i.e., a first receiver 301, a second receiver 303, a third receiver 305 and a fourth receiver 307, an LLR generation section 309, a deinterleaver 311, and a channel code decoder 313. Here, although it is not illustrated in FIG. 3, the four receivers 301 to 307 are connected with four antennas, respectively.

The first to fourth receivers 301 to 307 receive signals, which have been transmitted from four transmission antennas, respectively, and transfer the reception signals to the LLR generation section 309.

$$y = Hx + u \quad (5)$$

$$\Rightarrow \begin{bmatrix} y_0 \\ y_1 \\ y_2 \\ y_3 \end{bmatrix} = \begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix} \begin{bmatrix} x_0 \\ x_1 \\ x_2 \\ x_3 \end{bmatrix} + \begin{bmatrix} u_0 \\ u_1 \\ u_2 \\ u_3 \end{bmatrix}$$

The LLR generation section 309 applies QR decomposition to the reception signals, and generates LLR values of the respective symbols of the reception signals. Here, the QR decomposition means a scheme of expressing an input matrix as a product of a unitary matrix Q and an upper triangular matrix R. The QR decomposition operation of the LLR generation section 309 will be described in more detail below.

The deinterleaver 311 deinterleaves the LLR values according to a given rule so that bits may be located in their original order before interleaving, and then outputs the deinterleaved LLR values to the channel code decoder 313. The channel code decoder 313 acquires an information bit stream of the signals transmitted from four transmission antennas, based on the LLR values output from the deinterleaver 311.

Figure 4A:
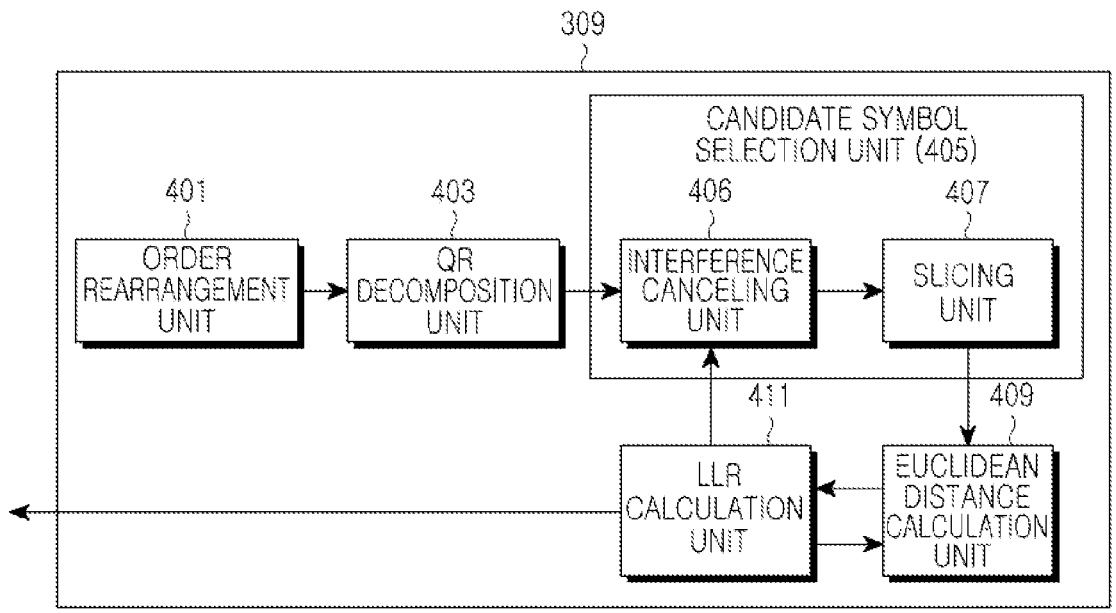
FIG. 4A is a block diagram illustrating a configuration of a Log-Likelihood Ratio (LLR) generation section according to an exemplary embodiment of the present invention.

FIG. 4A is a block diagram illustrating a configuration of an LLR generation section according to an exemplary embodiment of the present invention. The following description will be given based on the assumption that the 64 QAM modulation scheme is applied.

Referring to FIG. 4A, the LLR generation section 309 includes an order rearrangement unit 401, a QR decomposition unit 403, a candidate symbol selection unit 405, a Euclidean distance calculation unit 409, and an LLR calculation unit 411. The candidate symbol selection unit 405 includes an interference canceling unit 406 and a slicing unit 407.

The order rearrangement unit 401 groups symbols, i.e., [$x_0$, $x_1$, $x_2$, $x_3$], included in an x vector which has been acquired from signals received through four reception antennas (not illustrated), two by two, and rearranges and transfers two groups to the QR decomposition unit 403. In this case, a column permutation according to the rearranged symbol order is performed, so that a channel gain also is rearranged. Here, the rearranged group order exerts an influence on an order in which LLR values are calculated, and the order of the symbols in the groups has no direct relation to an exemplary embodiment of the present invention.

The QR decomposition unit 403 performs QR decomposition on a reception signal corresponding to the rearranged symbols. For example, [$x_0$ and $x_1$] and [$x_2$ and $x_3$] among symbols of the x vector are grouped into a first group and a second group, respectively. The order rearrangement unit 401 rearranges the order of the first and second groups, for example, in order of $x_3$, $x_2$, $x_1$, and $x_0$, and QR decomposition is performed on the rearranged groups. The order rearrangement unit 401 rearranges the order of the first and second groups in another order, for example, in order of $x_1$, $x_0$, $x_3$, and $x_2$, and then QR decomposition is performed on the rearranged groups. Here, although the description has been given regarding a case where the first group is first selected for convenience of description, an order of selecting groups has no direct relation to the present invention, so a detailed description thereof will be omitted.

Equation 6 below shows a result obtained by applying QR decomposition to an H matrix when the first and second groups are rearranged in order of $x_3$, $x_2$, $x_1$, and $x_0$.

$$H = QR \quad (6)$$
$$r = Q^H y = Rx + v, \quad v = Q_u^H$$

$$\Rightarrow \begin{bmatrix} r_0 \\ r_1 \\ r_2 \\ r_3 \end{bmatrix} = \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} x_3 \\ x_2 \\ x_1 \\ x_0 \end{bmatrix} = \begin{bmatrix} v_0 \\ v_1 \\ v_2 \\ v_3 \end{bmatrix}$$

In Equation 6, the Q matrix represents a unitary matrix, r denotes a transformation vector of a reception signal vector y, which is obtained using the Q matrix, and the R matrix represents a channel matrix obtained by transformation through QR decomposition and has an upper triangular structure. In this case, since the Q matrix has a unitary characteristic, the transformation of the reception signal vector y using the Q matrix exerts no influence on the reception performance. Also, the triangular structure of the R matrix allows candidate symbols for the respective symbols to be sequentially determined.

Thereafter, the interference canceling unit 406 selects a candidate symbol set for each symbol included in the first group according to the rearranged order. The interference canceling unit 406 selects the first symbol $x_0$ of the symbols included in the first group as a target symbol, the LLR of which is to be calculated, and selects all possible candidate symbol values for $x_0$ as elements of the candidate symbol set for the $x_0$. Thereafter, the interference canceling unit 406 selects elements constituting candidate symbol sets for the remaining symbols with respect to the respective possible candidate symbol values for $x_0$. More specifically, the interference canceling unit 406 cancels interference in the respective candidate symbols for $x_0$ in the reception signals, and transfers the respective signals, in which interference in every candidate symbol for $x_0$ has been canceled, to the slicing unit.

In an exemplary implementation, the slicing unit 407 may perform both a general operation using Equation 3 and a group slicing operation.

Figure 4B:
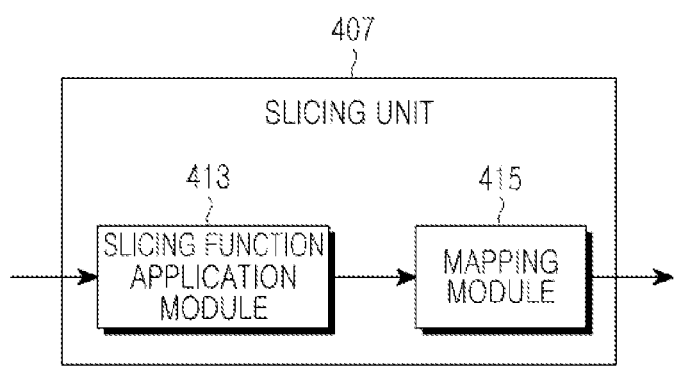
FIG. 4B is a block diagram illustrating an internal configuration of a slicing unit according to an exemplary embodiment of the present invention.

FIG. 4B is a block diagram illustrating an internal configuration of a slicing unit according to an exemplary embodiment of the present invention.

Referring to FIG. 4B, the slicing unit 407 includes a slicing function application module 413 and a mapping module 415.

First, the slicing function application module 413 performs group slicing using the respective reception signals, in which interference of every candidate symbol for $x_0$ has been canceled, and determines elements of a candidate symbol set for $x_1$, which is the symbol next to $x_0$.

Figure 5A:
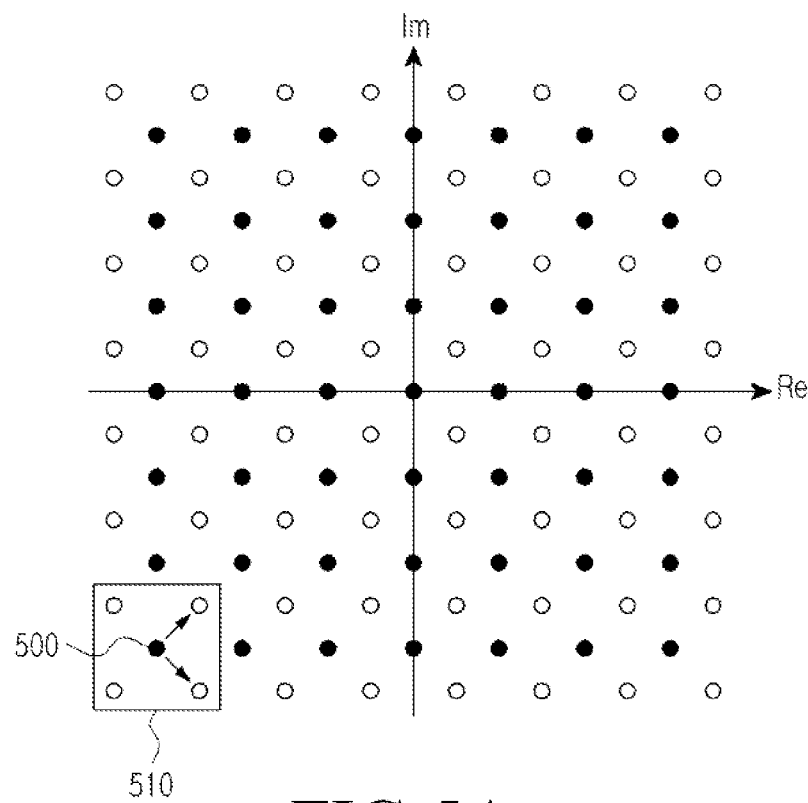
FIGS. 5A and 5B illustrate various examples of group slicing according to an exemplary embodiment of the present invention.
Figure 5B:
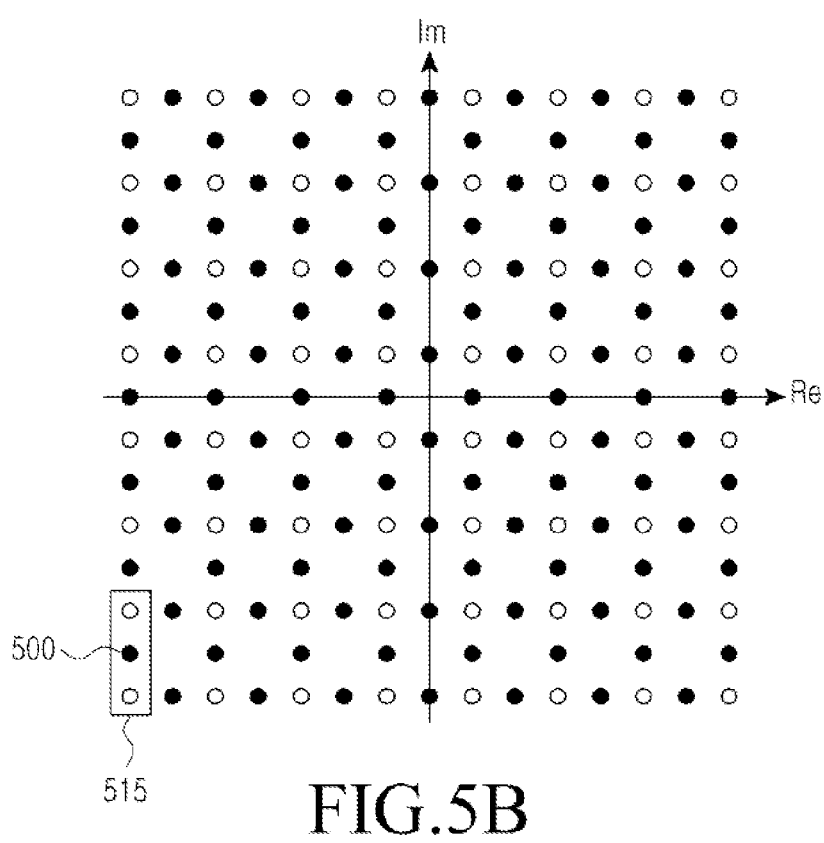

That is, the slicing function application module 413 performs slicing on a reception signal, in which interference of a first candidate symbol for $x_0$ has been canceled, and outputs a representative signal to the mapping module 415. Here, the representative signal represents an imaginary constellation point (i.e., a shaded circle), which is spaced by the same distance from a preset number of real constellation points (i.e., non-shaded circles) in a constellation, as illustrated in FIGS. 5A and 5B. The same distance corresponds to the shortest distance from the representative signal. When receiving the representative signal, the mapping module 415 determines symbols corresponding to the preset number of real constellation points, which are spaced by the same distance from the imaginary constellation point, as elements of a candidate symbol set for $x_1$, which is the symbol next to $x_0$. Hereinafter, an operation of determining a preset number of candidate symbols using a representative signal, as described above, will be called "group slicing." In an exemplary implementation, through the group slicing, a preset number of candidate symbols may be determined whenever group slicing is performed one time, which is different from a conventional method of determining only one candidate symbol whenever slicing is performed one time.

FIGS. 5A and 5B illustrate various examples of group slicing according to an exemplary embodiment of the present invention. FIGS. 5A and 5B illustrate a case where the 64 QAM modulation scheme is applied.

Referring to FIG. 5A, non-shaded circles represent real constellation points, and shaded circles represent imaginary constellation points in the constellation.

That is, when receiving a reception signal, from which interference of candidate symbols for a symbol has been canceled based on Equation 2, from an interference canceling unit 406, a slicing function application module 413 maps a slicing result value, i.e., a representative value, to one imaginary constellation point 500 of imaginary constellation points. Then, a mapping module 415 determines four real constellation points included in a region 510, which contains the four real constellation points being spaced by the shortest distance and by, the same distance from the imaginary constellation point 500, as candidate symbols.

Referring to FIG. 5B, when a representative signal 500 of the imaginary constellation point is acquired through the group slicing, as described with reference to FIG. 5A, two real constellation points included in a region 515, which contains the two real constellation points being spaced by the shortest distance and by the same distance from the representative signal 500 are determined as candidate symbols. FIGS. 5A and 5B illustrate, for example, cases where the number of candidate symbols determined using an imaginary constellation point is two and four, wherein the number of candidate symbols may be changed by taking reception performance, and the like into consideration. Similarly, the definition of the region 510 or 515 for determining candidate symbols may also be changed.

After the group slicing, an interference canceling unit 406 cancels interference of respective candidate symbols for $x_1$ determined through the group slicing, and transfers the reception signal, from which interference of the respective candidate symbols for $x_1$, to a slicing unit 407.

The slicing function application module 413 performs slicing on the reception signal, from which interference of the respective candidate symbols for $x_1$ has been canceled, by Equation 3. The symbols corresponding to result values of the slicing are determined as elements of a candidate symbol set for $x_1$. The interference canceling unit 406 and the slicing unit 407 perform the same operation on $x_2$ and $x_3$ as that performed on $x_1$, thereby determining elements of the respective candidate symbol sets for $x_2$ and $x_3$.

Equation 7 below shows an example of an equation by which the interference canceling unit 406 cancels interference of $x_0$ in a reception signal.

$$\begin{bmatrix} r_0 \\ r_1 \\ \widehat{r_2} \\ r_3 \end{bmatrix} = \begin{bmatrix} R_{00} & R_{01} & R_{02} & R_{03} \\ 0 & R_{11} & R_{12} & R_{13} \\ 0 & 0 & \widehat{R_{22}} & \cancel{R_{23}} \\ 0 & 0 & 0 & R_{33} \end{bmatrix} \begin{bmatrix} x_3 \\ x_2 \\ \widehat{x_1} \\ \cancel{x_0} \end{bmatrix} + \begin{bmatrix} v_0 \\ v_1 \\ \widehat{v_2} \\ v_3 \end{bmatrix} \quad (7)$$

More specifically, in $r_2$ which is a reception signal obtained from the reception signal y through the QR decomposition, interference $R_{23}x_0$ of one candidate symbol among the total candidate symbols for $x_0$ is canceled. Thereafter, a group slicing operation employing an imaginary constellation is performed using the interference-canceled reception signal.

Accordingly, candidate symbols for a second symbol, e.g., $x_1$, are determined. Thereafter, candidate symbols for $x_2$ and $x_3$ are also sequentially determined through interference canceling and slicing.

Meanwhile, when candidate symbols for $x_1$ are determined using an ML hard decision result, which is obtained by calculating the LLR of each bit included in $x_0$, interference $R_{22}x_1$ of one candidate symbol among candidate symbols for $x_1$ in $r_2$ is canceled as shown in Equation 8 below, without using separate QR decomposition, and then $r_2$ and $r_3$ are combined, so that $x_0$ is determined. Thereafter, candidate symbols for $x_2$ and $x_3$ are also sequentially determined through interference canceling and slicing.

$$\begin{bmatrix} r_0 \\ r_1 \\ r_2 \\ r_3 \end{bmatrix} = \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} x_3 \\ x_2 \\ x_1 \\ x_0 \end{bmatrix} + \begin{bmatrix} v_0 \\ v_1 \\ v_2 \\ v_3 \end{bmatrix} \quad (8)$$

Thereafter, the Euclidean distance calculation unit 409 calculates a Euclidean distance for the respective bit values of "0" and "1" included in each corresponding symbol with respect to every candidate symbol for $x_0$, and then transfers a result of the calculation to the LLR calculation unit 411. Then, the LLR calculation unit 411 calculates an LLR for $x_0$ by Equation 9 below using the Euclidean distance.

$$L_{D_1}(x_{0,k} \mid y) = \ln \frac{\sum_{x \in X_{k,+1}} p(y \mid x)}{\sum_{x \in X_{k,-1}} p(y \mid x)} \approx \frac{1}{2\sigma^2} \left\{ \min_{x \in X_{k,-1}} \|y - Hx\|^2 - \min_{x \in X_{k,+1}} \|y - Hx\|^2 \right\} \quad (9)$$

In Equation 9, $L_{D_1}(x_{0,k}|y)$ denotes an LLR value of a $k^{th}$ bit of $x_0$, P denotes a probability that y is x, and $\sigma^2$ denotes an average power of a background noise variable. Also, D1 means that a Euclidean distance has been taken into consideration upon calculating the LLR value. In addition, $X_{k,-1}$ represents a case where a bit included in a $k^{th}$ candidate symbol has a value of "1," and $X_{k,+1}$ represents a case where a bit included in a $k^{th}$ candidate symbol has a value of "0."

That is, the LLR calculation unit 411 calculates an LLR value for $x_0$ using a difference between minimum values of the respective Euclidean distances with respect to cases where each bit included in the respective candidate symbols for $x_0$ has a value of "0" and has a value of "1." Thereafter, the LLR calculation unit 411 again compares minimum values of the respective Euclidean distances with respect to cases where each bit included in the respective candidate symbols for $x_0$ has a value of "0" and has a value of "1," as shown in Equation 10, calculates a symbol vector $x_{ML}$, which is expressed as an "ML hard decision value," corresponding to a case of having the minimum value of them, and transfers the $x_{ML}$ to the candidate symbol selection unit 405 and the Euclidean distance calculation unit 409.

$$x_{ML} = \min_{x \in X} \|y - Hx\|^2 = \min_{x \in X}\{d_{min,-1}, d_{min,+1}\} \quad (10)$$

-continued where $d_{min,-1} = \min_{x \in X_{-1}} \|y - Hx\|^2$, $d_{min,+1} = \min_{x \in X_{+1}} \|y - Hx\|^2$.

The LLR calculation unit 411 determines values of the remaining symbols, i.e., $x_1$, $x_2$, and $x_3$, using the $x_{ML}$, based on Equation 11 below. When the values of the remaining symbols have been determined, candidate symbol sets for the respective remaining symbols are determined using the determined values.

$$L_{D_1}(x_{j,k} \mid y) = \begin{cases} \|y - Hx_{ML}\|^2 - \min_{x \in X_{k,+1}} \|y - Hx\|^2 & \text{if } x_{ML} \in X_{k,-1} \\ \min_{x \in X_{k,-1}} \|y - Hx\|^2 - \|y - Hx_{ML}\|^2 & \text{if } x_{ML} \in X_{k,+1} \end{cases} \quad (11)$$

That is, when the values of $x_1$, $x_2$, and $x_3$ have been determined using the $x_{ML}$, the candidate symbol selection unit 405 selects a portion of candidate symbols among symbols located in a constellation, having a bit value different from the determined values of $x_1$, $x_2$, and $x_3$, based on a preset criteria. In this case, the candidate symbol selection unit 405 determines candidate symbols having a bit value different from the determined bit value, by taking a distance from a candidate symbol corresponding to each corresponding symbol value determined using $x_{ML}$, a reception performance, and the like, into consideration. That is, in order to reduce the amount of calculations for performance, as described above, $x_{ML}$ of the first symbol is used so that only a portion of the candidate symbols among the total candidate symbols for the remaining symbols are selected.

Figure 6:
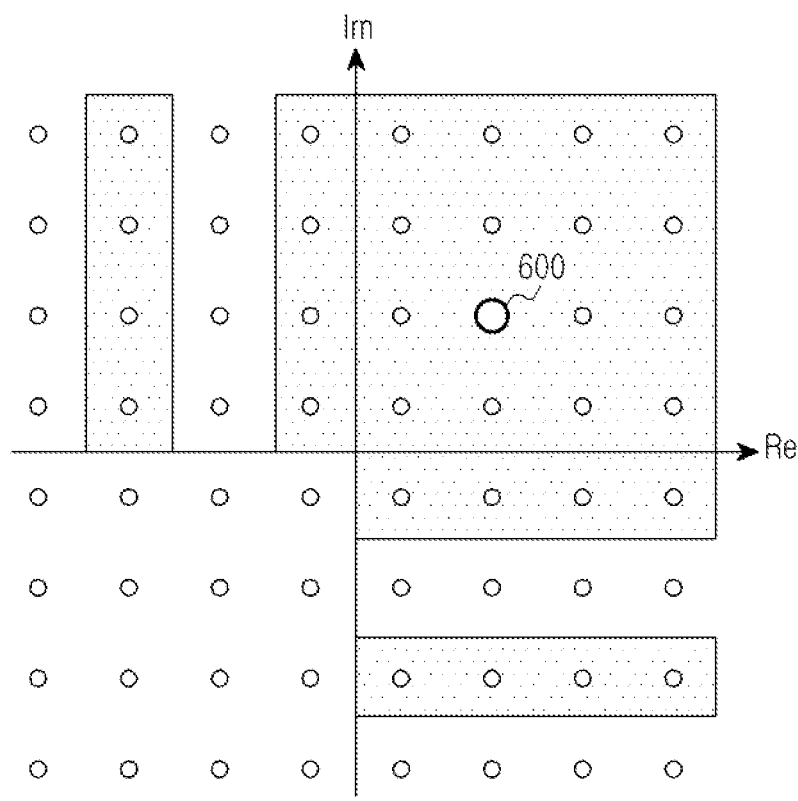
FIG. 6 illustrates an example of an operation of determining candidate symbol sets for respective remaining symbols through a use of values of respective remaining symbols determined using an ML hard decision value, according to an exemplary embodiment of the present invention.

FIG. 6 illustrates an example of an operation of determining candidate symbol sets for respective remaining symbols through a use of values of respective remaining symbols determined using an ML hard decision value, according to an exemplary embodiment of the present invention. Here, the following description will be given based on the assumption that a 64 QAM modulation scheme is applied.

Referring to FIG. 6, a symbol 600 is one of the remaining symbols, i.e., $x_1$, $x_2$, and $x_3$, and is determined to have a value of "0" by the $x_{ML}$. For example, elements of a candidate symbol set for the symbol 600 are symbols determined by taking a distance from the symbol 600 and performance into consideration within a region, in which bits having a value different from the value of the symbol 600 are distributed, in a constellation, and the elements are located in a shaded region. That is, it should be understood that, since the number of elements of the candidate symbol set for the symbol 600 is determined using the $x_{ML}$, the number of elements is reduced to ½ as compared with the total number of candidate symbols, which is 64 in number. The number of elements of a candidate symbol set is illustrated in FIG. 6 for convenience of description. Therefore, the number of elements may be changed.

Thereafter, when candidate symbol sets for respective remaining symbols, i.e., $x_1$, $x_2$, and $x_3$, have been determined using the $x_{ML}$, the interference canceling unit 406 cancels interference of candidate symbols for each of $x_1$, $x_2$, and $x_3$, from a reception signal, and transfers the reception signal to the slicing function application module 413. The slicing function application module 413 performs a slicing operation on the reception signal, from which interference of candidate symbols for each of $x_1$, $x_2$, and $x_3$ has been canceled, and outputs a representative signal of one symbol of remaining symbols $x_0$, $x_3$, and $x_2$ to the mapping module 415.

The mapping module 415 performs a group slicing operation of determining symbols, which correspond to a preset number of real constellation points located at positions spaced by the same distance from each representative value of $x_0$, $x_3$, and $x_2$, as candidate symbols for each of $x_0$, $x_3$, and $x_2$.

Thereafter, the candidate symbol selection unit 405 cancels interference of candidate symbols for each of $x_0$, $x_3$, and $x_2$ from the reception signal, and performs a slicing operation on the reception signal, thereby determining candidate symbols for the remaining symbols.

The operation of the candidate symbol selection unit 405, described above, will now be described in more detail with reference to FIGS. 7A and 7B.

Figure 7A:
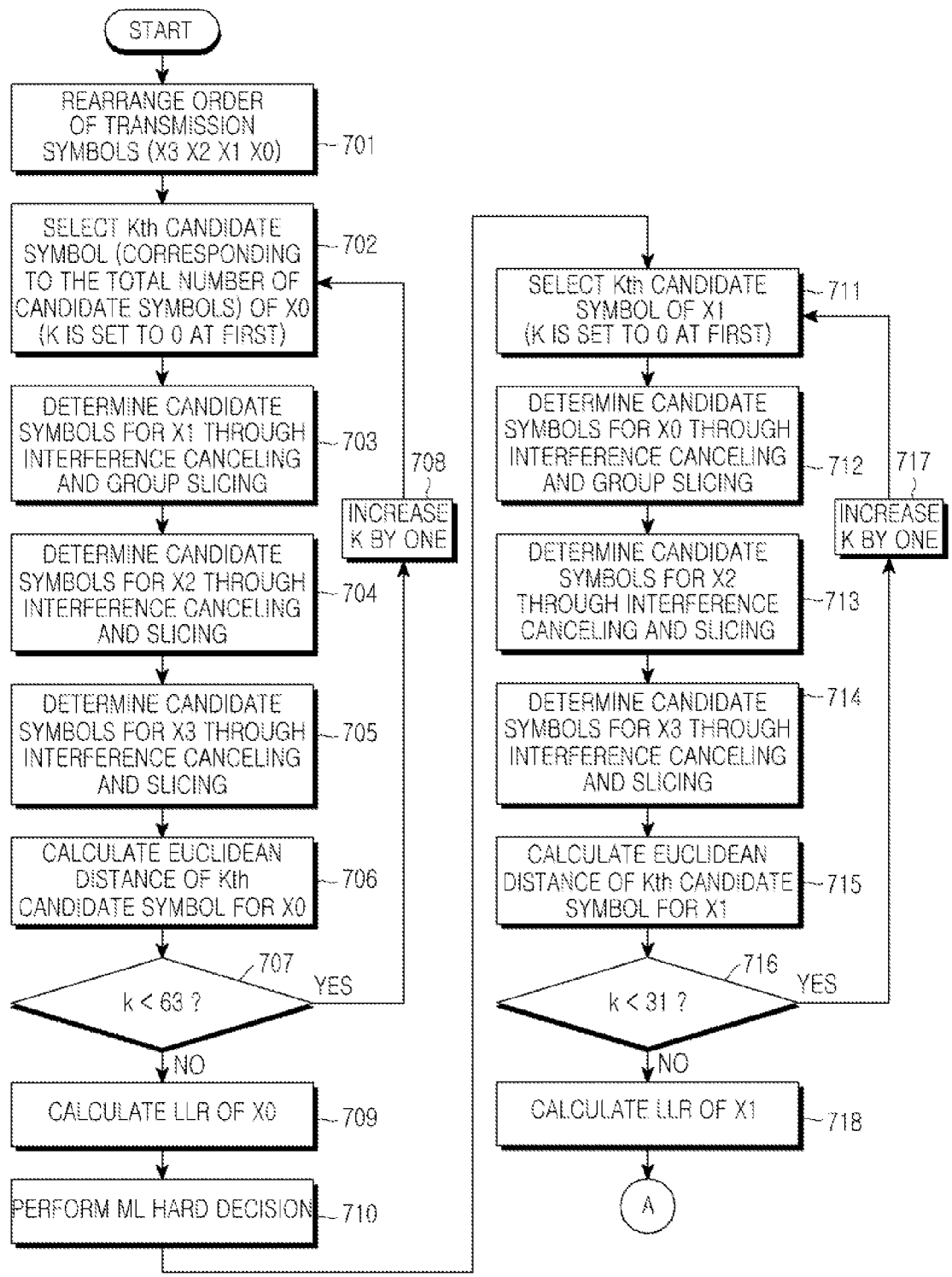
FIGS. 7A and 7B are flowcharts illustrating an operation of an LLR generation section according to an exemplary embodiment of the present invention.
Figure 7B:
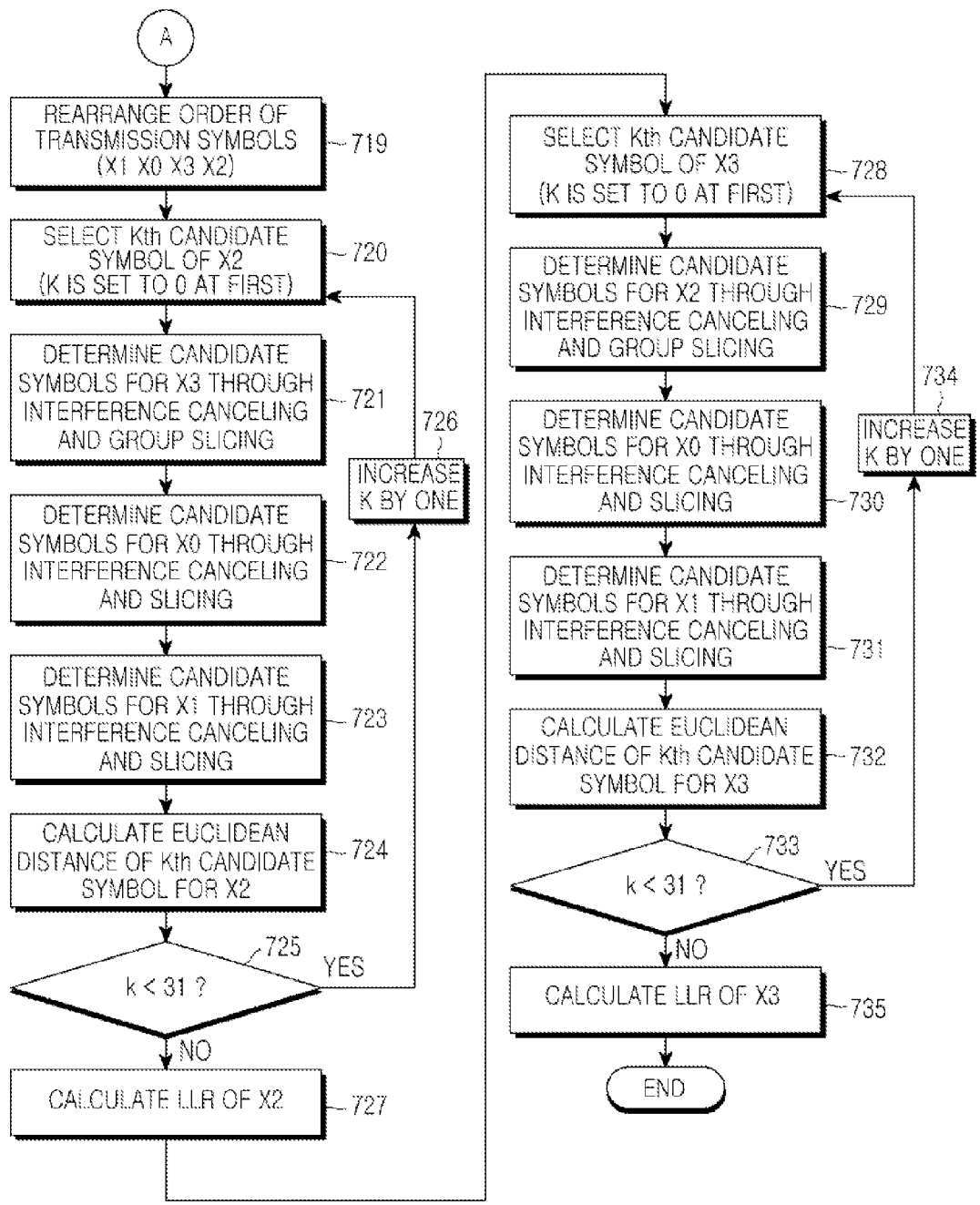

FIGS. 7A and 7B are flowcharts illustrating an operation of an LLR generation section according to an exemplary embodiment of the present invention. Here, for convenience of description, the following description will be given based on the assumption that a 64 QAM modulation scheme is applied. Although the LLR generation section includes a plurality of components, as illustrated in FIGS. 4A and 4B, the following description will be given in such a manner that the LLR generation section performs all the operations of the components, for convenience of description.

Referring to FIG. 7A, the LLR generation section rearranges an order of symbols to be received in step 701. In this case, the symbols $x_0$, $x_1$, $x_2$, and $x_3$ are received through four reception antennas, respectively. The symbols are grouped into two groups, i.e., a first group of $[x_0, x_1]$ and a second group of $[x_2, x_3]$, and the order of the groups are rearranged. Here, the following description will be given based on the assumption that the symbols of the groups are arranged in order of $x_3$, $x_2$, $x_1$ and $x_0$, as an example. The reception signal constituted by the rearranged symbols is transformed by applying QR decomposition to the reception signal. In this case, a column permutation of a channel matrix is performed corresponding to the order of the rearranged symbols, so that a channel gain is also rearranged. Here, the order of the rearranged groups exerts an influence on an order in which LLR values are calculated, and the order of the symbols in the groups has no direct relation to an exemplary embodiment of the present invention.

In step 702, the LLR generation section selects a $k^{th}$ candidate symbol among all candidate symbols for $x_0$. Here, "k" represents an index of candidate symbols for $x_0$ and is set to "0" at an initial operation.

In step 703, the LLR generation section cancels interference due to the selected $k^{th}$ candidate symbol for $x_0$ in the transformed reception signal, performs a group slicing operation with respect to the interference-canceled reception signal, and determines candidate symbols for the next symbol, i.e., $x_1$. In this case, a preset number of real constellation points, which are spaced by the shortest distance and by the same distance from an imaginary constellation point corresponding to a representative signal acquired through the group slicing operation, are determined as the candidate symbols for $x_1$. In step 704, the LLR generation section cancels interference due to a $k^{th}$ candidate symbol of the determined candidate symbols for $x_1$ in the transformed reception signal, performs a slicing operation with respect to the interference-canceled reception signal and determines candidate symbols for the next symbol, i.e., $x_2$.

In step 705, the LLR generation section cancels interference due to a $k^{th}$ candidate symbol for $x_2$ in the transformed reception signal, performs a slicing operation with respect to the interference-canceled reception signal, and determines candidate symbols for the next symbol, i.e., $x_3$.

In step 706, the LLR generation section calculates a Euclidean distance of the $k^{th}$ candidate symbol for $x_0$.

In step 707, the LLR generation section determines if the value of "k" is less than 63. If it is determined that the value of "k" is less than 63, the LLR generation section increases the value of "k" by one in step 708, and returns to step 702 in order to perform the operation for the next candidate symbol for $x_0$. If it is determined that the value of "k" is equal to or greater than 63, operations for all the candidate symbols have been completed. Therefore, in this case, the LLR generation section calculates an LLR of $x_0$ by Equation 7 in step 709.

In step 710, the LLR generation section again compares minimum values of the respective Euclidean distances with respect to cases where each bit of each candidate symbol for $x_0$ has a value of "0" and has a value of "1," and calculates an ML hard decision value $x_{ML}$ which is a symbol vector corresponding to a case of having a minimum value of them. Then, in a procedure (i.e., steps 711 to 718 for $x_1$, steps 720 to 727 for $x_2$, and steps 728 to 735 for $x_3$) of calculating an LLR of remaining symbols using the ML hard decision value, the LLR generation section determines a candidate symbol group for the symbols, an LLR of which is to be calculated, in step 711 for $x_1$, in step 720 for $x_2$, and in step 728 for $x_3$.

In step 711, the LLR generation section selects a $k^{th}$ candidate symbol for $x_1$ in the reception signal. Here, "k" represents an index of candidate symbols for $x_1$, and is set to "0" at an initial operation. In step 712, the LLR generation section cancels interference due to the selected $k^{th}$ candidate symbol for $x_1$ in the transformed reception signal, performs a group slicing operation with respect to the interference-canceled reception signal, and determines candidate symbols for $x_0$. In this case, a preset number of real constellation points, which are spaced by the shortest distance and by the same distance from an imaginary constellation point corresponding to a representative signal acquired through the group slicing operation, are determined as the candidate symbols for $x_0$.

In step 713, the LLR generation section cancels interference due to a $k^{th}$ candidate symbol for $x_1$ in the reception signal, performs a slicing operation with respect to the interference-canceled reception signal, and determines candidate symbols for $x_2$.

In step 714, the LLR generation section cancels interference due to a $k^{th}$ candidate symbol for $x_2$ in the reception signal, performs a slicing operation with respect to the interference-canceled reception signal, and determines candidate symbols for $x_3$.

In step 715, the LLR generation section calculates a Euclidean distance of the $k^{th}$ candidate symbol for $x_1$.

In step 716, the LLR generation section determines if the value of "k" is less than the number of candidate symbols for remaining symbols, that is, is less than 31. If it is determined that the value of "k" is less than 31, the LLR generation section increases the value of "k" by one in step 717, and returns to step 711. If it is determined that the value of "k" is equal to or greater than 31, the LLR generation section calculates an LLR of $x_1$ by Equation 7 in step 718.

Referring to FIG. 7B, the LLR generation section rearranges an order of symbols in step 719. In this case, the symbols are grouped into two groups, i.e., a first group of $[x_0, x_1]$ and a second group of $[x_2, x_3]$, and the order of the groups are rearranged. Here, the following description will be given based on the assumption that the symbols of the groups are arranged in order of $x_1$, $x_0$, $x_3$ and $x_2$, as an example. The reception signal constituted by the rearranged symbols is transformed applying QR decomposition to the reception signal. In this case, a column permutation of a channel matrix is performed corresponding to the order of the rearranged symbols, so that a channel gain is also rearranged. Here, the order of the rearranged groups exerts an influence on an order in which LLR values are calculated, and the order of the symbols in the groups has no direct relation to an exemplary embodiment of the present invention.

In step 720, the LLR generation section selects a $k^{th}$ candidate symbol for $x_2$. Here, "k" represents an index of candidate symbols for $x_2$, and is set to "0" at a first time.

In step 721, the LLR generation section cancels interference due to the selected $k^{th}$ candidate symbol for $x_2$ in the transformed reception signal, performs a group slicing operation with respect to the interference-canceled reception signal, and determines candidate symbols for the next symbol, i.e., $x_3$. In this case, a preset number of real constellation points, which are spaced by the shortest distance and by the same distance from an imaginary constellation point corresponding to a representative signal acquired through the group slicing operation, are determined as the candidate symbols for $x_3$.

In step 722, the LLR generation section cancels interference due to a $k^{th}$ candidate symbol for $x_3$ in the reception signal, performs a slicing operation with respect to the interference-canceled reception signal, and determines candidate symbols for the next symbol, i.e., $x_0$.

In step 723, the LLR generation section cancels interference due to a $k^{th}$ candidate symbol for $x_0$ in the transformed reception signal, performs a slicing operation with respect to the interference-canceled reception signal, and determines candidate symbols for the next symbol, i.e., $x_1$.

In step 724, the LLR generation section calculates a Euclidean distance of the $k^{th}$ candidate symbol for $x_2$.

In step 725, the LLR generation section determines if the value of "k" is less than 31. If it is determined that the value of "k" is less than 31 as a result of the check, the LLR generation section increases the value of "k" by one in step 726, and returns to step 720. If it is determined that the value of "k" is equal to or greater than 31, operations for all the candidate symbols have been completed. Therefore, in this case, the LLR generation section calculates an LLR of $x_2$ by Equation 7 in step 727.

In step 728, the LLR generation section selects a $k^{th}$ candidate symbol for $x_3$. Here, "k" represents an index of candidate symbols for $x_3$, and is set to "0" at an initial operation. In step 729, the LLR generation section cancels interference due to the selected $k^{th}$ candidate symbol for $x_3$ in the transformed reception signal, performs a group slicing operation with respect to the interference-canceled reception signal, and determines candidate symbols for $x_2$. In this case, a preset number of real constellation points, which are spaced by the shortest distance and by the same distance from an imaginary constellation point corresponding to a representative signal acquired through the group slicing operation, are determined as the candidate symbols for $x_2$.

In step 730, the LLR generation section cancels interference due to a $k^{th}$ candidate symbol for $x_2$ in the reception signal, performs a slicing operation with respect to the interference-canceled reception signal, and determines candidate symbols for the next symbol, i.e., $x_0$.

In step 731, the LLR generation section cancels interference due to a $k^{th}$ candidate symbol for $x_0$ in the reception signal, performs a slicing operation with respect to the interference-canceled reception signal, and determines candidate symbols for the next symbol, i.e., $x_1$.

In step 732, the LLR generation section calculates a Euclidean distance of the $k^{th}$ candidate symbol for $x_3$.

In step 733, the LLR generation section determines if the value of "k" is less than 31. If it is determined that the value of "k" is less than 31, the LLR generation section increases the value of "k" by one in step 734, and returns to step 728. If it is determined that the value of "k" is equal to or greater than 31, operations for all the candidate symbols have been completed. Therefore, in this case, the LLR generation section calculates an LLR of $x_3$ by Equation 7 in step 735, and then terminates the procedure.

As described above, according to an exemplary embodiment of the present invention, through an ML hard decision value and group slicing, the number of candidate symbols decreases depending on the order of symbols, so that the amount of calculations required for detecting a reception signal is significantly reduced while the performance similar to that obtained in the ML detection scheme is obtained.

According to the exemplary embodiments of the present invention, since candidate symbols for the remaining symbols, except for a first symbol, are determined using an ML hard decision result of the first symbol, the number of candidate symbols for each remaining symbol is reduced, so that the amount of calculations of Euclidean distances and LLRs is reduced. In addition, according to the exemplary embodiments of the present invention, a preset number of candidate symbols for each corresponding symbol can be determined through group slicing using an imaginary constellation. Accordingly, the method and apparatus according to the exemplary embodiments of the present invention can reduce the complexity of calculations while maintaining a similar performance to that obtained by the ML detection scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiving method in a Multiple-Input Multiple-Output (MIMO) communication system, the method comprising:
    receiving reception signals through a plurality of reception antennas;
    grouping symbols corresponding to the reception signals, respectively, into a preset number of groups, and rearranging symbols of the respective groups;
    transforming the reception signals by applying QR decomposition to the reception signals;
    sequentially canceling interference in the transformed reception signals due to each of total possible candidate symbols for a first symbol based on an order of the rearranged symbols;
    determining a portion of the total possible candidate symbols to be a candidate symbol set for each remaining symbol, except for the first symbol, using the interference-canceled reception signal;
    determining log-likelihood ratio values of the first symbol, which are to be used upon decoding the reception signals, using candidate symbols for the first symbol and each remaining symbol;
    comparing a minimum Euclidean value when each bit of each of the total possible candidate symbols has a value of "1" with a minimum Euclidean value when each bit of each of the total possible candidate symbols has a value of "0,"
    determining a symbol vector corresponding to when a lower value of the two minimum Euclidean values as a maximum likelihood hard decision result value; and
    determining a log-likelihood ratio of each of the remaining symbols using the maximum likelihood hard decision result value.

2. The method as claimed in claim 1, wherein the determining of the portion of the total possible candidate symbols to be a candidate symbol set for each remaining symbol comprises:

acquiring a representative signal by performing a slicing operation on the interference-canceled reception signal; and determining symbols corresponding to at least two constellation points, which are spaced by a shortest distance and by an equal distance from a constellation point corresponding to the representative signal in a pre-defined constellation.

3. The method as claimed in claim 1, wherein the determining of the log-likelihood ratio values comprises:

determining an Euclidean distance for cases where each bit of each of the total possible candidate symbols has a value of "1" and has a value of "0"; and determining a difference between minimum values of Euclidean distances for cases where each bit of each of the total possible candidate symbols has a value of "1" and has a value of "0," thereby determining the log-likelihood ratio of the first symbol.

4. The method as claimed in claim 1 wherein the log-likelihood ratio of each of the remaining symbols is determined by equation below:

$$L_{D_1}(x_{j,k} \mid y) = \begin{cases} \|y - Hx_{ML}\|^2 - \min_{x \in X_{k,+1}} \|y - Hx\|^2 & \text{if } x_{ML} \in X_{k,-1} \\ \min_{x \in X_{k,-1}} \|y - Hx\|^2 - \|y - Hx_{ML}\|^2 & \text{if } x_{ML} \in X_{k,+1}, \end{cases}$$

wherein $L_{D_1}(x_{j,k} \mid y)$ denotes an LLR value of a $k^{th}$ bit of $x_j$, $x_{ML}$ denotes the maximum likelihood hard decision result value, y denotes a reception signal vector, H denotes a channel matrix vector, x denotes a symbol vector, k denotes an index of a candidate symbol, $X_{k,-1}$ denotes a case where a bit of a $k^{th}$ candidate symbol has a value of "1," and $X_{k,+1}$ represents a case where a bit of a $k^{th}$ candidate symbol has a value of "0."

5. The method as claimed in claim 1, wherein the QR decomposition corresponds to expressing a channel matrix as a product of a Q matrix and an R matrix, which are a unitary matrix and an upper triangular matrix, respectively.

6. A receiving apparatus in a Multiple-Input Multiple-Output (MIMO) communication system, the apparatus comprising:

a reception unit for receiving reception signals through a plurality of reception antennas;

an order rearrangement unit for grouping symbols corresponding to the reception signals, respectively, into a preset number of groups, and rearranging symbols of the respective groups;

a QR decomposition unit for transforming the reception signals by applying QR decomposition to the reception signals;

in the transformed reception signals due to each of total possible candidate symbols for a first symbol based on an order of the rearranged symbols;

a candidate symbol selection unit for determining a portion of the total possible candidate symbols to be a candidate symbol set for each remaining symbol, except for the first symbol, using the interference-canceled reception signal; and a log-likelihood ratio calculation unit for determining log-likelihood ratio values of the first symbol, which is to be used upon decoding the reception signals, using candidate symbols for the first symbol and each remaining symbol, wherein the log-likelihood ratio calculation unit compares a minimum Euclidean value when each bit of each of the total possible candidate symbols has a value of "1" with a minimum Euclidean value when each bit of each of the total possible candidate symbols has a value of "0," determines a symbol vector corresponding to when a lower value of the two minimum Euclidean values as a maximum likelihood hard decision result value, and determines a log-likelihood ratio of each of the remaining symbols using the maximum likelihood hard decision result value.

7. The apparatus as claimed in claim 6, wherein the candidate symbol selection unit acquires a representative value by performing a slicing operation on the interference-canceled reception signal, and determines symbols corresponding to at least two constellation points, which are spaced by a shortest distance and by an equal distance from a constellation point corresponding to the representative value in a pre-defined constellation.

8. The apparatus as claimed in claim 6, further comprising an Euclidean distance calculation unit for determining an Euclidean distance for cases where each bit of each of the total possible candidate symbols has a value of "1" and has a value of "0,"

wherein the log-likelihood ratio calculation unit determines a difference between minimum values of Euclidean distances for cases where each bit of each of the total possible candidate symbols has a value of "1" and has a value of "0," thereby determining the log-likelihood ratio of the first symbol, the Euclidean distances being acquired from the Euclidean distance calculation unit.

9. The apparatus as claimed in claim 6, wherein the log-likelihood ratio of each of the remaining symbols is determined by equation below:

$$L_{D_1}(x_{j,k} \mid y) = \begin{cases} \|y - Hx_{ML}\|^2 - \min_{x \in X_{k,+1}} \|y - Hx\|^2 & \text{if } x_{ML} \in X_{k,-1} \\ \min_{x \in X_{k,-1}} \|y - Hx\|^2 - \|y - Hx_{ML}\|^2 & \text{if } x_{ML} \in X_{k,+1}, \end{cases}$$

wherein $L_{D_1}(x_{j,k} \mid y)$ denotes an LLR value of a $k^{th}$ bit of $x_j$, $x_{ML}$ denotes the maximum likelihood hard decision result value, y denotes a reception signal vector, H denotes a channel matrix vector, x denotes a symbol vector, k denotes an index of a candidate symbol, $X_{k,-1}$ denotes a case where a bit of a $k^{th}$ candidate symbol has a value of "1," and $X_{k,+1}$ represents a case where a bit of a $k^{th}$ candidate symbol has a value of "0."

10. The apparatus as claimed in claim 6, wherein the QR decomposition corresponds to expressing channel matrix as a product of a Q matrix and an R matrix, which are a unitary matrix and an upper triangular matrix, respectively.

* * * * *